United States Patent
Wadas et al.

(10) Patent No.: US 6,875,155 B2
(45) Date of Patent: Apr. 5, 2005

(54) AUTOMATIC SPLITTER AND GOVERNOR CONTROL FOR MANUALLY SHIFTED TRANSMISSION

(75) Inventors: David L. Wadas, Kalamazoo, MI (US); Michael E. Lemon, Battle Creek, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/452,883

(22) Filed: Jun. 2, 2003

(65) Prior Publication Data

US 2004/0242373 A1 Dec. 2, 2004

(51) Int. Cl.$^7$ ............................................... B60K 41/04
(52) U.S. Cl. ...................................... 477/109; 477/111
(58) Field of Search ................................ 477/108–109, 477/111, 113

(56) References Cited

U.S. PATENT DOCUMENTS

| | | | |
|---|---|---|---|
| 3,429,202 A | 2/1969 | Gallcher | |
| 4,228,700 A | * 10/1980 | Espenschied et al. | ........ 477/154 |
| 4,267,750 A | * 5/1981 | Espenschied et al. | ........ 477/163 |
| 4,361,060 A | 11/1982 | Smyth | |
| 4,361,065 A | 11/1982 | Wilcox et al. | |
| 4,455,883 A | 6/1984 | Radcliffe | |
| 4,550,627 A | 11/1985 | Lauer et al. | |
| 4,561,325 A | 12/1985 | Jester | |
| 4,595,986 A | 6/1986 | Daubenspeck et al. | |
| 4,663,725 A | 5/1987 | Truckenbrod et al. | |
| 4,754,665 A | 7/1988 | Vandervoort | |
| 4,920,815 A | 5/1990 | Reynolds | |
| 5,000,060 A | 3/1991 | Reynolds et al. | |
| 5,054,591 A | 10/1991 | Braun | |
| 5,193,410 A | 3/1993 | Stine et al. | |
| 5,222,404 A | 6/1993 | Stine | |
| 5,272,931 A | 12/1993 | Daniel | |
| 5,335,566 A | 8/1994 | Genise et al. | |
| 5,368,145 A | 11/1994 | Davis | |
| 5,370,013 A | 12/1994 | Reynolds et al. | |
| 5,390,561 A | 2/1995 | Stine | |
| 5,435,212 A | 7/1995 | Menig | |
| 5,474,505 A | 12/1995 | Seidel et al. | |
| 5,582,558 A | 12/1996 | Palmeri et al. | |
| 5,651,292 A | 7/1997 | Genise | |
| 5,661,998 A | 9/1997 | Genise | |
| 5,682,790 A | 11/1997 | Genise | |
| 5,735,771 A | * 4/1998 | Genise | ........................ 477/111 |
| 5,743,143 A | 4/1998 | Carpenter et al. | |
| 5,755,639 A | 5/1998 | Genise et al. | |
| 5,766,111 A | 6/1998 | Steeby et al. | |

(Continued)

Primary Examiner—Roger Pang
(74) Attorney, Agent, or Firm—Rader, Fishman & Grauer PLLC

(57) ABSTRACT

A system and method for completing an automatic up-shift during an engine progressive governor event in a controller-assisted, manually shifted compound transmission system (10) and splitter shift control therefor. Auxiliary splitter section (16B) shifts are automatically implemented by a splitter shifter (28) under commands (56) from a controller (48). The controller (48) overrides the engine governor control and controls engine torque to approach, and preferably reach a zero torque condition and bring the transmission to a splitter-neutral condition to enable an automatic up-shift when the splitter button has been selected or lever shift has been moved by the operator. Depending on the type of shift event, the transmission will automatically complete the upshift or the operator can manually complete the upshift after engine synchronization. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims. 37 CFR 1.72(b).

21 Claims, 7 Drawing Sheets

U.S. PATENT DOCUMENTS

| | | |
|---|---|---|
| 5,791,189 A | 8/1998 | Newbigging |
| 5,911,787 A | 6/1999 | Walker |
| 5,938,711 A | 8/1999 | Steeby et al. |
| 5,974,906 A | 11/1999 | Stine et al. |
| 5,989,155 A * | 11/1999 | Wadas et al. ............... 477/111 |
| 6,007,455 A | 12/1999 | Steeby |
| 6,015,366 A | 1/2000 | Markyvech et al. |
| 6,042,504 A | 3/2000 | Gualtieri et al. |
| 6,044,721 A | 4/2000 | Genise |
| 6,095,003 A * | 8/2000 | Genise .................. 74/335 |
| 6,135,918 A | 10/2000 | Bellinger et al. |
| 6,220,219 B1 | 4/2001 | Wadas et al. |
| 6,361,473 B1 * | 3/2002 | Mason et al. ............... 477/124 |
| 6,364,810 B1 | 4/2002 | Hughes |
| 6,461,274 B1 * | 10/2002 | Genise et al. ............... 477/109 |
| 6,502,476 B2 | 1/2003 | Genise |

* cited by examiner

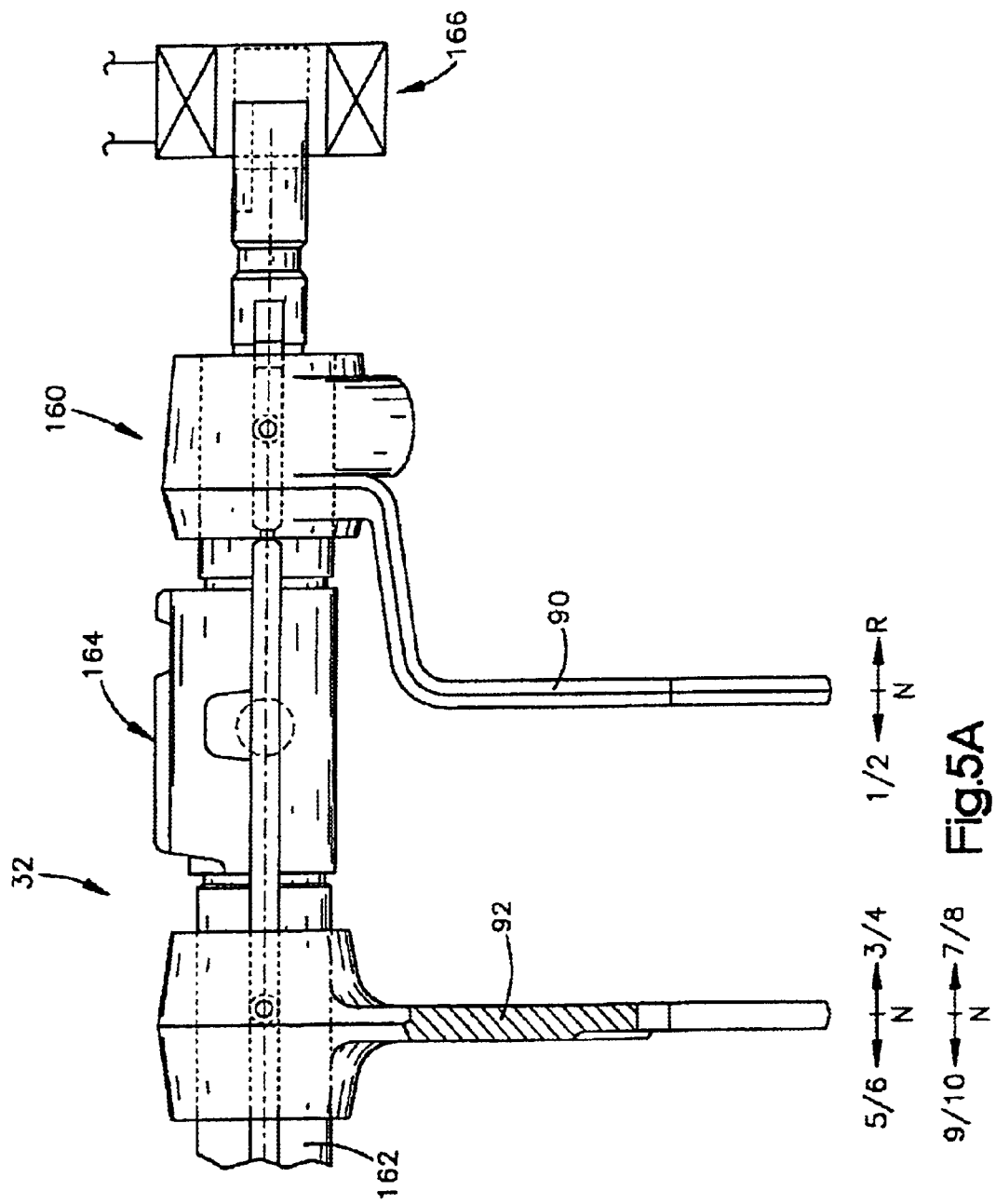

AUTOMATIC SPLITTER AND GOVERNOR CONTROL FOR MANUALLY SHIFTED TRANSMISSION

BACKGROUND OF THE INVENTION

1. Field of the Invention

The present invention relates to automatic splitter shifting in a manually shifted compound transmission having a lever-shifted main section connected in series with an auxiliary splitter or splitter-and-range section. In particular, the present invention relates to a splitter control for transmissions of the type described for automatically implementing splitter up-shifts and/or splitter-and-range shifts during a manual lever shift when an engine governor event is encountered.

2. Description of the Related Art

Controller-assisted, manually shifted transmission systems are known in the prior art, as may be seen by reference to U.S. Pat. Nos. 5,582,558; 5,755,639; 5,766,111; 5,791,189; 5,974,906; 5,989,155 and 6,015,366, the disclosures of which are incorporated herein by reference.

Compound transmissions having a range and/or combined range-and splitter-type auxiliary transmission section are well known in the prior art, as may be seen by reference to U.S. Pat. Nos. 4,754,665 and 5,390,561, the disclosures of which are incorporated herein by reference.

Transmissions having manually shifted main sections and automatically shifted splitter sections are known in the prior art, as may be seen by reference to U.S. Pat. Nos. 5,435,212; 5,938,711; 6,007,455 and 6,044,721, the disclosures of which are incorporated herein by reference.

Compound transmissions having automatically implemented range shifting are well known in the prior art, as may be seen by reference to U.S. Pat. Nos. 5,911,787 and 5,974,906, the disclosures of which are incorporated herein by reference.

One technique for controlling engine fueling to thereby limit engine speed during manual gear shifting operations is commonly referred to as progressive shift governor control, as may be seen by reference to U.S. Pat. No. 6,135,918, the disclosure of which is incorporated herein by reference. In progressive shift governor control, a linear engine speed limit, or governed engine speed limit, is typically established by specifying a first engine speed limit RPM1 at a first vehicle speed VS1, and a second engine speed limit RPM2 at a second vehicle speed VS2. The governed engine speed limit linearly increases from RPM1 to RPM2 between VS1 and VS2 and is held constant at RPM2 beyond VS2, wherein RPM2 is typically less than rated engine speed. Rated engine speed is defined for purposes of the present invention as the engine speed at which the engine produces an advertised horsepower value.

The purpose of progressive shift governor control is to gradually increase available engine speed (and thus more engine power) as vehicle speed increases between VS1 and VS2, wherein typical values for VS1 and VS2 are 0.0 and 40 mph, respectively. This engine speed limiting scheme accordingly encourages the vehicle operator to manually shift gears at lower engine speeds than may otherwise occur, particularly in the lower transmission gears, thereby resulting in fuel savings associated with more efficient engine operation.

While the progressive shift governor control feature achieves the goal of encouraging vehicle operators to shift at lower engine speeds, it has certain drawbacks associated therewith. For example, when descending a grade or when hauling a heavily loaded trailer on level ground, providing a hard limit on available engine speed can hinder the drivability of the vehicle. One example of such hindered drivability may occur when attempting an automatic up-shift during an engine progressive shift governor event when descending a downhill grade, or moving at speed on level ground in a heavily loaded condition under low throttle, hereinafter characterized as a coasting condition or coasting. When in the coasting condition, the engine is being forced by the inertia of the vehicle to rotate at a higher speed than is commanded by the engine controller. Under the control of the progressive shift governor control, the governed engine speed limit may cause the vehicle to enter into a coasting condition in which the vehicle is driving the engine at a speed greater than that permitted by the progressive shift governor control, irrespective of the throttle position, resulting in a negative driveline torque. If the operator attempts to select the next higher gear by depressing the splitter button under such a negative torque condition, it may not be possible to shift gears due to the negative torque. As a result, the operator may be forced to break torque by depressing the clutch so that the transmission may be shifted to splitter-neutral and then to splitter high for the desired up-shift, thereby overcoming much of the benefit of an automated shift.

SUMMARY OF THE INVENTION

In accordance with the present invention, a manually shifted compound transmission with a splitter or combined splitter-and-range auxiliary section is provided, which will automatically shift the splitter section and/or automatically disengage and then reengage the splitter section as long as the lever position does not change. Logic rules are provided to determine when the splitter should be reengaged after the splitter is shifted to neutral.

The foregoing is accomplished in a manually shifted compound transmission having a lever-shifted main section connected in series with a splitter or combined splitter-and-range auxiliary section having an actuator for automatically implementing controller-initiated splitter shifts by sensing vehicle operating conditions.

Accordingly, one aspect of the present invention is to provide a method for controlling splitter shifting in a controller-assisted, manually shifted vehicular transmission system. The method comprises the steps of sensing if (1) an up-shift target gear ratio is selected and (2) a coasting condition is present; and overriding an engine governor to approach a zero torque condition if the sensing step is satisfied, thereby placing the splitter auxiliary section in a splitter-neutral condition.

Another aspect of the present invention is to provide a method for controlling splitter shifting in a controller-assisted, manually shifted vehicular transmission system. The method comprises the steps of sensing if (1) an up-shift target gear ratio is selected and (2) overriding an engine governor to approach a zero torque condition when the sensing step is satisfied, thereby enabling the splitter auxiliary section to be placed in a splitter-neutral condition.

Another aspect of the present invention is to provide a method for controlling splitter shifting in a controller-assisted, manually shifted vehicular transmission system. The method comprises the steps of sensing if (1) an up-shift target gear ratio is selected and (2) a coasting condition is present; and if satisfied, temporarily overriding an engine governor control to enabling a splitter auxiliary section to be placed in a splitter-neutral condition.

Yet another aspect of the present invention is to provide a new and improved splitter shift control for manually shifted compound transmissions having a splitter shifter for automatically implementing splitter shifts, wherein a controller includes logic rules for:

sensing if (1) an up-shift target gear ratio is selected and (2) a coasting condition is present; and controlling an engine torque to approach a zero torque condition if the up-shift target gear ratio is selected and the coasting condition is present, thereby enabling the splitter auxiliary section to be placed in a splitter-neutral condition.

These and other aspects of the present invention will become apparent from a reading of the following description of the preferred embodiment taken in connection with the attached drawings.

BRIEF DESCRIPTION OF THE DRAWINGS

In the drawings:

FIGS. 5A and 5B are schematic illustrations of a shift shaft position sensor mechanism for use in the system of FIG. 1.

DESCRIPTION OF THE PREFERRED EMBODIMENT

Figure 1:
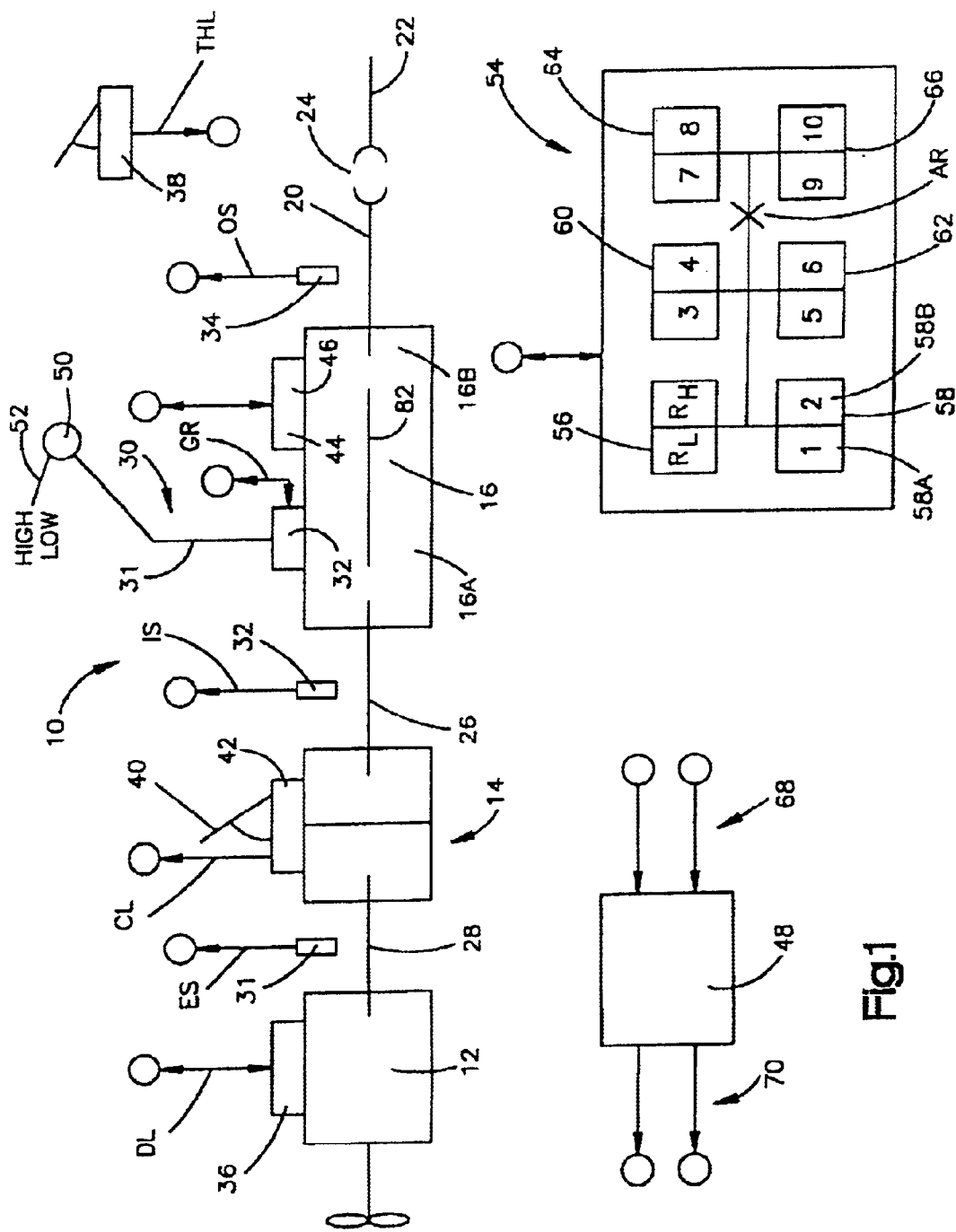
FIG. 1 is a schematic illustration of an ECU-assisted compound mechanical transmission system advantageously utilizing the range shifting control of the present invention.

A computer-assisted (i.e., microprocessor-based, controller-assisted) vehicular compound mechanical transmission system 10, particularly well suited to utilize the range shift control of the present invention, may be seen by reference to FIGS. 1–5B.

System 10 is of the type commonly utilized in heavy-duty vehicles, such as the conventional tractors of tractor/semi-trailer vehicles, and includes an engine, typically a diesel engine 12, a master friction clutch 14 contained within a clutch housing, a multiple-speed compound transmission 16, and a drive axle assembly (not shown). The transmission 16 includes an output shaft 20 drivingly coupled to a vehicle drive shaft 22 by a universal joint 24 for driving the drive axle assembly. The transmission 16 is housed within a transmission housing to which is directly mounted the shift tower of the shift lever assembly 30. The present system is equally applicable to remotely mounted shift levers, as are used in cab-over-engine types of vehicles.

Figure 2:
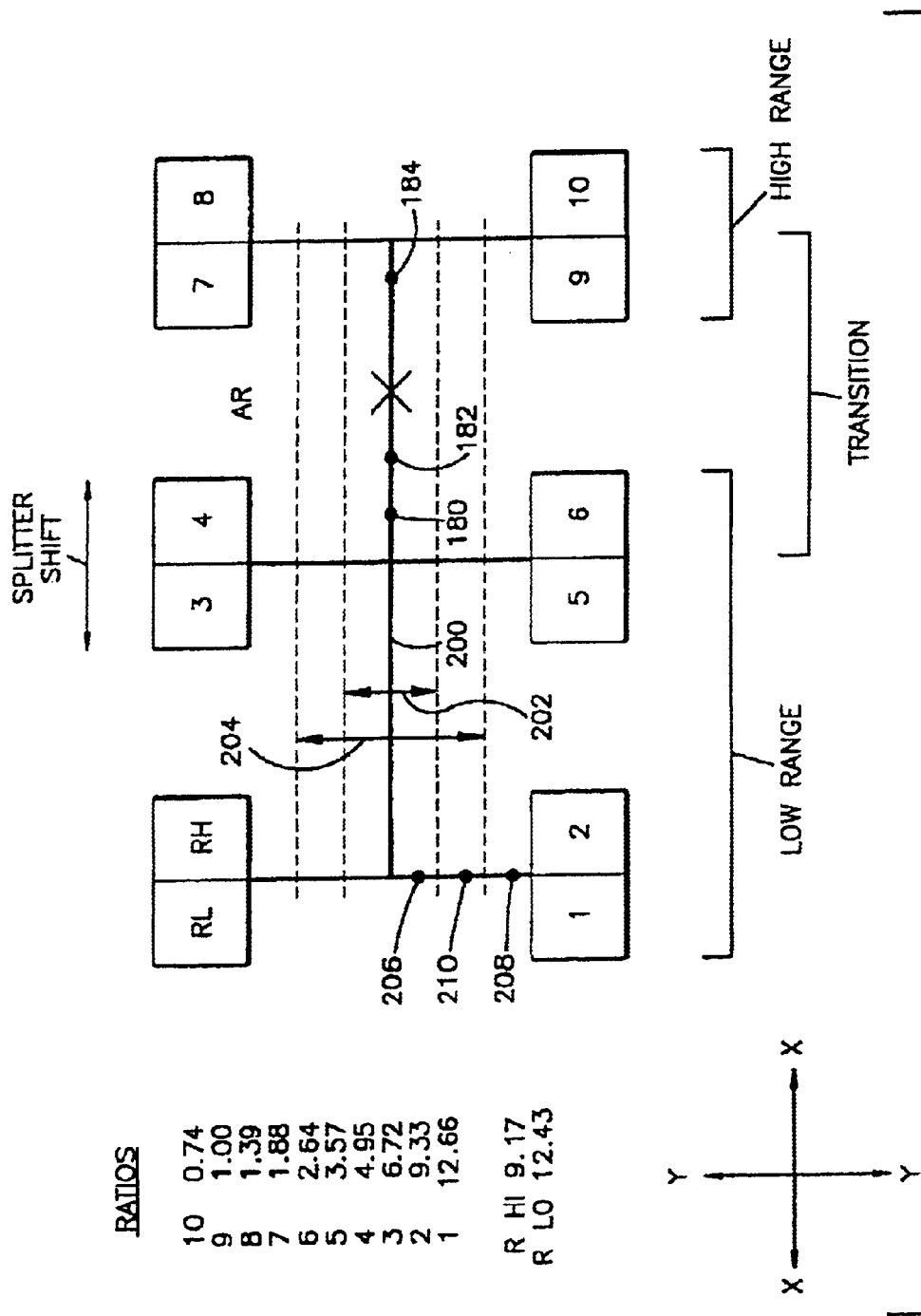
FIG. 2 is a chart illustrating the shift pattern and representative numerical ratios for the transmission of FIG. 1.

FIG. 2 illustrates a shift pattern for assisted manual shifting of a combined range-and-splitter-type compound transmission shifted by a manually operated shift lever.

Briefly, the shift lever 31 is movable in the side-to-side or X—X direction to select a particular ratio or ratios to be engaged and is movable in the fore and aft or Y—Y direction to selectively engage and disengage the various ratios. The shift pattern may include an automatic range shifting feature and automatically selected and/or implemented splitter shifting, as is known in the prior art. Manual transmissions utilizing shift mechanisms and shift patterns of this type are well known in the prior art and may be appreciated in greater detail by reference to aforementioned U.S. Pat. Nos. 5,000, 060 and 5,390,561.

Typically, the shift lever assembly 30 will include a shift finger or the like (not shown) extending downwardly into a shifting mechanism 32, such as a multiple-rail shift bar housing assembly or a single shift shaft assembly, as is well known in the prior art and as is illustrated in aforementioned U.S. Pat. Nos. 4,455,883; 4,550,627; 4,920,815 and 5,272, 931.

In the automatic range shifting feature, as the shift lever moves in the transition area between the middle leg ($\frac{3}{4}$–$\frac{5}{6}$) and the righthand leg ($\frac{7}{8}$–$\frac{9}{10}$) of the shift pattern, it will cross a point, AR, which will actuate a mechanical or electrical range switch, or will be sensed by a position sensor, to cause automatic implementation of a range shift.

The present invention also is applicable to transmission systems of the type utilizing range shift selector switches which are manually operated independent of shift lever position, as illustrated in aforementioned U.S. Pat. No. 5,222,404.

Shifting of transmission 16, comprising main section 16A coupled in series to auxiliary section 16B, is semi-automatically implemented/assisted by the vehicular transmission system 10, illustrated in FIGS. 1–5B. Main section 16A includes an input shaft 26, which is operatively coupled to the drive or crank shaft 28 of the vehicle engine 12 by master clutch 14, and output shaft 20 of auxiliary section 16B is operatively coupled, commonly by means of a drive shaft 24, to the drive wheels of the vehicle. The auxiliary section 16B is a splitter type, preferably a combined range-and-splitter type, as illustrated in U.S. Pat. Nos. 4,754,665 and 5,390,561.

The change-gear ratios available from main transmission section 16 are manually selectable by manually positioning the shift lever 31 according to the shift pattern prescribed to engage the particular desired change gear ratio of main section 16A.

The system may include sensors 30 (for sensing engine rotational speed (ES)), 32 (for sensing input shaft rotational speed (IS)), and 34 (for sensing output shaft rotational speed (OS)), and providing signals indicative thereof. As is known, with the clutch 14 (i.e., no slip) engaged and the transmission engaged in a known gear ratio, ES=IS=OS*GR (see U.S. Pat. No. 4,361,060). Accordingly, if clutch 14 is engaged, engine speed and input shaft speed may be considered as equal. Input shaft speed sensor 32 may be eliminated and engine speed (ES), as sensed by a sensor or over a data link (DL), substituted therefor.

Engine 12 is electronically controlled, including an electronic controller 36 communicating over an electronic data link (DL) operating under an industry standard protocol such as SAE J-1922, SAE J-1939, ISO 11898 or the like. Throttle position (operator demand) is a desirable parameter for selecting shifting points and in other control logic. A separate throttle position sensor 38 may be provided or throttle position (THL) may be sensed from the data link. Gross engine torque ($T_{EG}$) and base engine friction torque ($T_{BEF}$) also are available on the data link.

A manual clutch pedal 40 controls the master clutch 14, and a sensor 42 provides a signal (CL) indicative of clutch-engaged or -disengaged condition. The condition of the clutch also may be determined by comparing engine speed to input shaft speed if both signals are available. An auxiliary section actuator 44 including a range shift actuator and a splitter actuator 46 is provided for operating the range clutch and the splitter section clutch in accordance with command output signals from ECU 48. The shift lever 31 has a knob 50 which contains splitter selector switch 52 by which a driver's intent to initiate a splitter shift may be sensed.

System 10 may include a driver's display unit 54 including a graphic representation of the six-position shift pattern with individually lightable display elements 56, 58, 60, 62, 64 and 66, representing each of the selectable engagement positions. Preferably, each half of the shift pattern display elements (i.e., 58A and 58B) will be individually lightable, allowing the display to inform the driver of the lever and splitter position for the engaged ratio.

The system includes a control unit or ECU 48, preferably a microprocessor-based control unit of the type illustrated in U.S. Pat. Nos. 4,595,986; 4,361,065 and 5,335,566, the disclosures of which are incorporated herein by reference, for receiving input signals 68 and processing same according to predetermined logic rules to issue command output signals 70 to system actuators, such as the splitter section actuator 46, the engine controller 36, the range shift actuator and/or the display unit 54. A separate system controller may be utilized, or the engine controller ECU 36 communicating over an electronic data link may be utilized.

As shown in U.S. Pat. Nos. 5,651,292 and 5,661,998 (the disclosures of which are incorporated herein by reference), the splitter actuator 46 is, preferably, a three-position device, allowing a selectable and maintainable splitter section neutral. Alternatively, a "pseudo" splitter-neutral may be provided by deenergizing the splitter actuator when the splitter clutch is in an intermediate, non-engaged position.

Figure 3:
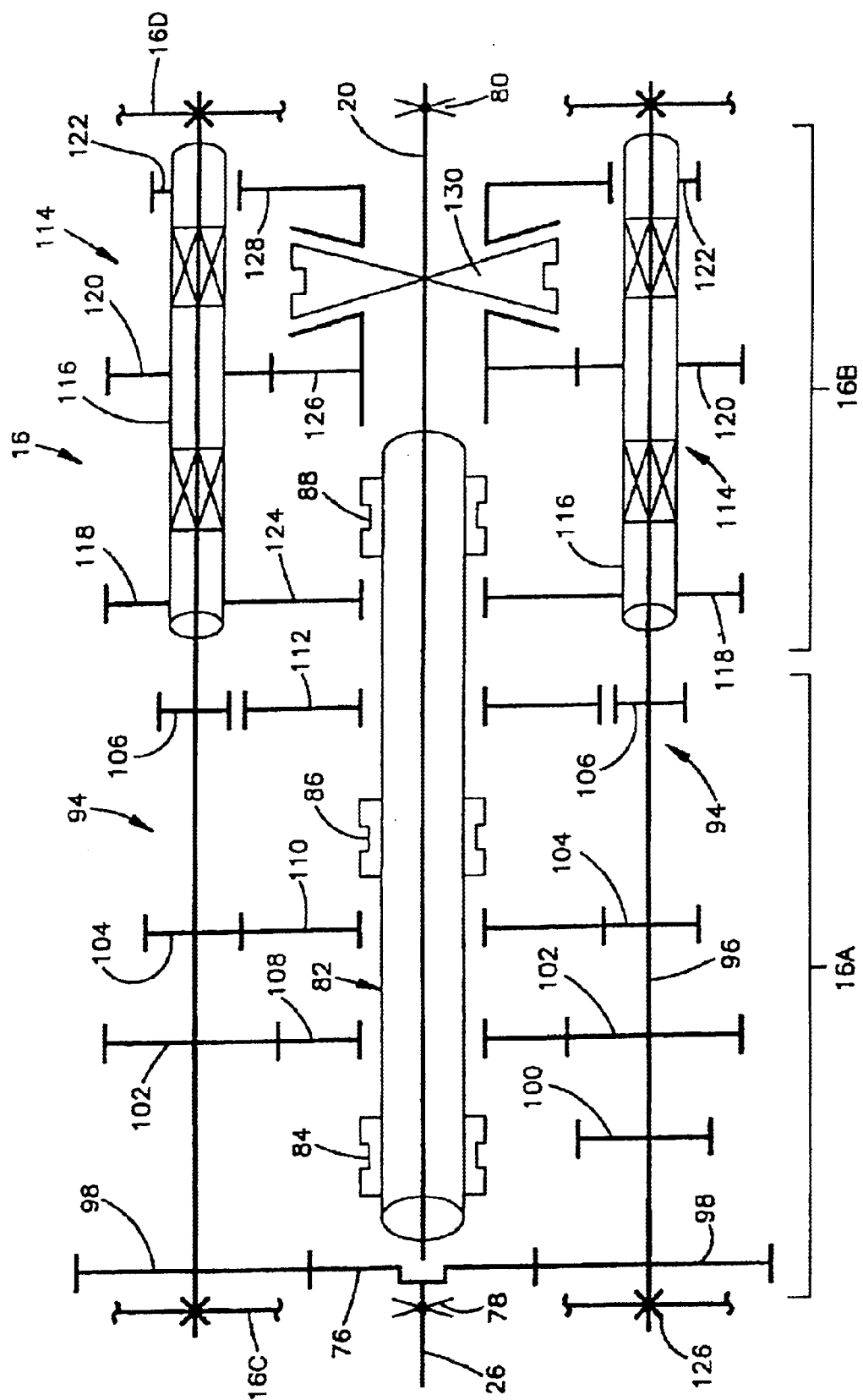
FIG. 3 is a schematic illustration of the structure of the compound mechanical transmission of FIG. 1.

The structure of the 10-forward-speed combined range-and-splitter-type transmission 16 is schematically illustrated in FIG. 3. Transmissions of this general type are disclosed in aforementioned U.S. Pat. Nos. 5,000,060; 5,370,013 and 5,390,561.

Transmission 16 includes a main section 16A and an auxiliary section 16B, both contained within a housing including a forward end wall 16C, which may be defined by the clutch housing, and a rearward end wall 16D, but (in this particular embodiment) not an intermediate wall.

Input shaft 26 carries input gear 76 fixed for rotation therewith and defines a rearwardly opening pocket wherein a reduced diameter extension of output shaft 20 is piloted. A non-friction bushing or the like may be provided in the pocket or blind bore. The rearward end of input shaft 26 is supported by bearing 78 in front end wall 16C, while the rearward end of output shaft 20 is supported by bearing assembly 80 in rear end wall 16D.

The mainshaft 82, which carries mainshaft clutches 84 and 86, and the mainshaft splitter clutch 88 is in the form of a generally tubular body having an externally splined outer surface and an axially extending through bore for passage of output shaft 20. Shift forks 90 and 92 are provided for shifting clutches 84 and 86, respectively (see FIG. 5A). Mainshaft 82 is independently rotatable relative to input shaft 26 and output shaft 20 and preferably is free for limited radial movement relative thereto.

The main section 16A includes two substantially identical main section countershaft assemblies 94, each comprising a main section countershaft 96 carrying countershaft gear pairs 98, 102, 104 and 106 fixed thereto. Gear pairs 98, 102, 104 and 106 are constantly meshed with input gear 76, mainshaft gears 108 and 110 and an idler gear (not shown), which is meshed with reverse mainshaft gear 112, respectively. One of the countershaft assemblies 94 may include a gear 100, commonly known as a power take-off gear.

Main section countershaft 96 extends rearwardly into the auxiliary section, where its rearward end is supported directly or indirectly in rear housing end wall 16D.

The auxiliary section 16B of transmission 16 includes two substantially identical auxiliary countershaft assemblies 114, each including an auxiliary countershaft 116 carrying auxiliary countershaft gears 118, 120 and 122 for rotation therewith. Auxiliary countershaft gear pairs 118, 120 and 122 are constantly meshed with splitter gear 124, splitter/range gear 126 and range gear 128, respectively. Splitter clutch 88 is fixed to mainshaft 82 for selectively clutching either gear 124 or 126 thereto, while synchronized range clutch 130 is fixed to output shaft 20 for selectively clutching either gear 126 or gear 128 thereto.

Auxiliary countershafts 116 are generally tubular in shape, defining a through bore for receipt of the rearward extensions of the main section countershafts 96. Bearings or bushings are provided to rotatably support auxiliary countershaft 116 on main section countershaft 96.

The splitter jaw clutch 88 is a double-sided, non-synchronized clutch assembly which may be selectively positioned in the rightwardmost or leftwardmost positions for engaging either gear 126 or gear 124, respectively, to the mainshaft 82 or to an intermediate position wherein neither gear 124 or 126 is clutched to the main shaft. Splitter jaw clutch 88 is axially positioned by means of a shift fork 98 controlled by a three-position actuator, such as a piston actuator, which is responsive to a driver selection switch such as a button or the like on the shift knob, as is known in the prior art and to control signals from ECU 48 (see U.S. Pat. No. 5,661,998). Two-position synchronized range clutch assembly 130 is a two-position clutch which may be selectively positioned in either the rightwardmost or leftwardmost positions thereof for selectively clutching either gear 128 or 126, respectively, to output shaft 20. Clutch assembly 130 is positioned by means of a shift fork (not shown) operated by means of a two-position piston device. Either piston actuator may be replaced by a functionally equivalent actuator, such as a ball screw mechanism, ball ramp mechanism or the like.

By selectively axially positioning both the splitter clutch 88 and the range clutch 130 in the forward and rearward axial positions thereof, four distinct ratios of mainshaft rotation to output shaft rotation may be provided. Accordingly, auxiliary transmission section 16B is a three-layer auxiliary section of the combined range and splitter type providing four selectable speeds or drive ratios between the input (mainshaft 82) and output (output shaft 20) thereof. The main section 16A provides a reverse and three potentially selectable forward speeds. However, one of the selectable main section forward gear ratios, the low-speed gear ratios associated with mainshaft gear 110, is not utilized in the high range. Thus, transmission 16 is properly designated as a "(2+1)×(2×2)" type transmission providing nine or ten selectable forward speeds, depending upon the desirability and practicality of splitting the low gear ratio.

Splitter shifting of transmission 16 is accomplished responsive to initiation by a vehicle operator-actuated splitter button 52 or the like, usually a button located at the shift lever knob, while operation of the range clutch shifting assembly is an automatic response to movement of the gear shift lever between the central and rightwardmost legs of the shift pattern, as illustrated in FIG. 2. Alternatively, splitter shifting may be automated (see U.S. Pat. No. 5,435,212). Range shift devices of this general type are known in the prior art and may be seen by reference to aforementioned U.S. Pat. Nos. 3,429,202; 4,455,883; 4,561,325 and 4,663,725.

To protect the range synchronizers, a properly executed range shift should occur in the sequence of (i) disengaging the main section by shifting to main section neutral, (ii) then initiating and completing the range section shift, and (iii) then, after the range section shift is completed, engaging the main section in the appropriate ratio.

As is known in the prior art, range clutch damage, also called "range synchronizer burnout," is most likely to occur in three situations: (i) if the main section is engaged prior to completion of a range up-shift, (ii) if the main section is engaged prior to completion of a range downshift, or (iii) if a range downshift is attempted at too high a vehicle speed. As will be discussed below, the range shift control of the present invention is effective to minimize or eliminate damage under such occurrences and to allow rapid and dependable completion of permissible range shifts.

Although the present invention is illustrated in the embodiment of a compound transmission not having an intermediate wall, the present invention is equally applicable to transmissions of the type illustrated in aforementioned U.S. Pat. Nos. 4,754,665; 5,193,410 and 5,368,145.

According to the present invention, and as more fully described in aforementioned U.S. Pat. No. 5,651,292, the interengaging clutch teeth provided on splitter clutch 88 and on splitter gear 124 and splitter/range gear 126 are of a relatively large backlash (i.e., about 0.020–0.060 inches for a 3.6-inch pitch diameter clutch), which will assure that almost any attempted splitter shift under full force will be completed.

Figure 4:
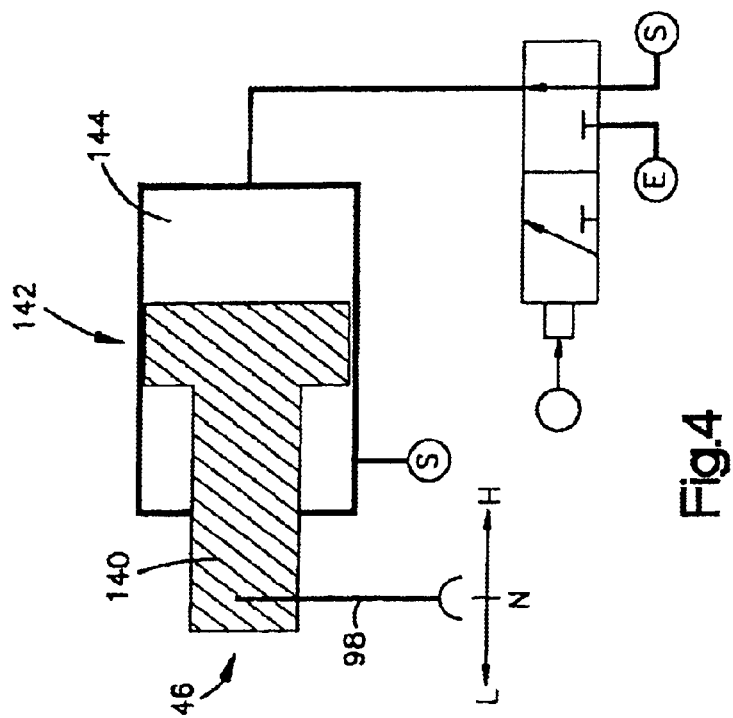
FIG. 4 is a schematic illustration of a three-position splitter actuator for use with the transmission system of FIG. 1.

The clutch 88 is moved by a shift fork 98 attached to the piston rod 140 of the piston actuator assembly 142 (see FIG. 4). Actuator assembly 142 may be a conventional three-position actuator (see U.S. Pat. No. 5,054,591, the disclosure of which is incorporated herein by reference) or an actuator of the type illustrated in U.S. Pat. No. 5,682,790 or 5,661,998 (the disclosures of which are incorporated herein by reference), wherein pulse width modulation of a selectively pressurized and exhausted chamber 144 may be used to achieve the three splitter positions (L, N, H) of the shift fork.

Preferably, the splitter clutch actuator 142 will be capable of applying a variable force, such as by pulse width modulation, of supply pressure. A force lesser than full force may be utilized when disengaging and/or when synchronous conditions cannot be verified.

The controller 48 is provided with logic rules under which, if the main section is engaged, a shift from splitter neutral into a selected target splitter ratio is initiated such that, under normal conditions, including proper operator fuel control, the synchronous error (which is equal to input shaft rotational speed minus the product of output shaft rotational speed and transmission target gear ratio) is expected to be equal to or less than a value selected to give smooth, high-quality shifts ((IS−(OS*GR))=ERROR≦REF). The timing is done in regard to sensed/expected shaft speeds, shaft acceleration/deceleration and actuator reaction times.

In certain situations, the logic rules will recognize operating conditions wherein the preferred synchronous window (i.e., IS=(OS*GR)±60 RPM) must be expanded to accomplish a splitter shift, even at the expense of shift quality. These situations, usually associated with up-shifts, include if shifting attempted at low engine speeds wherein expected engine speed at shift completion will be undesirably low, if deceleration of the output shaft is relatively high (dOS/dt<REF), if the deceleration of the engine is relatively low (dES/dt>REF) and/or if the absolute value of the synchronous error is not approaching the normal value at an acceptable rate.

The position of the shift lever 31 or of the shifting mechanism 32 controlled thereby may be sensed by a position sensor device. Various positioning sensing assemblies are known in the prior art, with a preferred type illustrated in allowed U.S. Pat. No. 5,743,143, assigned to the assignee of this application, the disclosure of which is incorporated herein by reference.

Figure 5B:
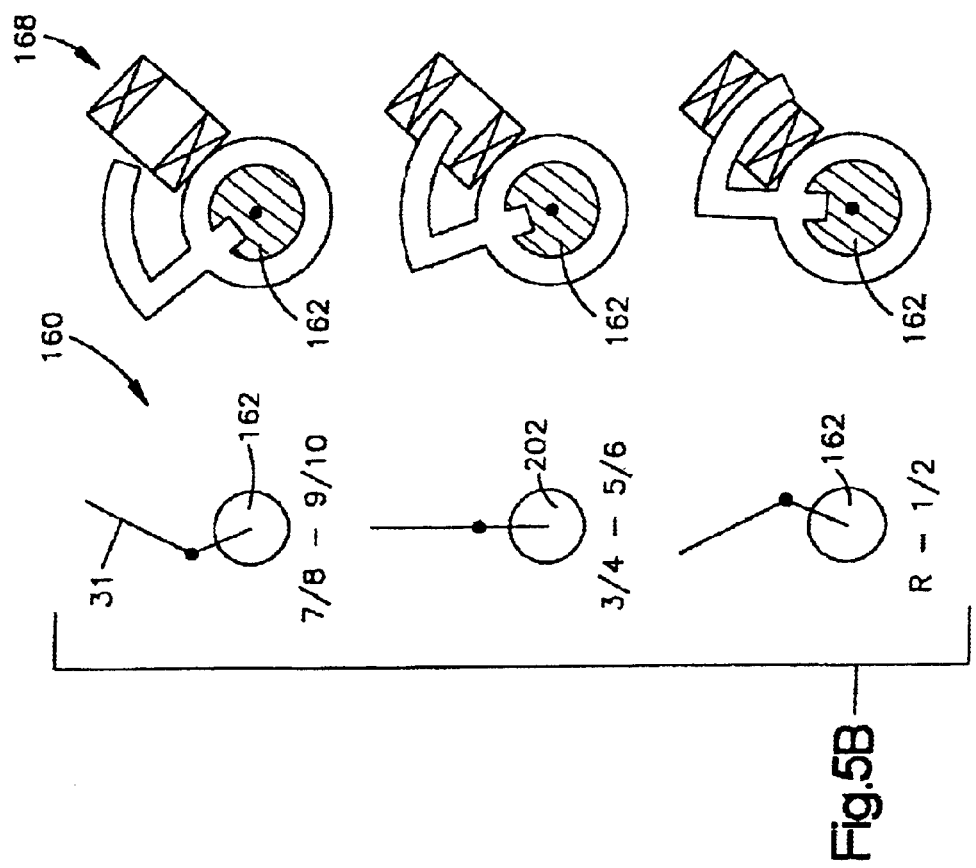

Referring to FIGS. 5A and 5B, shifting mechanism 32 is illustrated as a single shift shaft device 160 having a shaft 162 which is rotatable in response to X—X movements of shift lever 31 and axially movable in response to Y—Y movements of shift lever 31. Mechanisms of this type are described in detail in aforementioned U.S. Pat. No. 4,920,815.

Shift shaft 162 carries the main section shift forks 90 and 92 for selective axial movement therewith and a shift block member 164 for receiving a shift finger or the like. A pair of coils 166 and 168 provides a pair of signals (collectively GR) indicative of the axial and rotational position of shaft 162 and, thus, of shift lever 31 relative to the shift pattern illustrated in FIG. 2. Preferably, the rate of change of position (dGR/dt) also may be determined and utilized to enhance shifting of the system 10.

By way of example, referring to FIG. 2, if shift lever position can be sensed, the need for a fixed switch or the like at point AR to sense a required initiation of a shift between low range and high range is eliminated. Further, as physical switches are no longer required, the shift pattern position at which a range shift will be commanded can be varied, such as to points 180, 182 or 184, to enhance system performance under various operating conditions.

If in first (1st) through fourth (4th), a shift into high range is unlikely, and the auto range shift initiation point may be moved to position 184 (away from the expected shift lever path) to prevent inadvertent actuation of a range shift. If in sixth (6th) with a high engine speed, a shift into high range is likely and moving the auto range initiation point to position 180 will allow for a quicker initiation of a range shift.

According to the present invention, the operator is allowed to control engine fueling unless the current vehicle operating conditions indicate that his/her operation of the throttle pedal will not allow the jaw clutches associated with the current target ratio to engage. If operating conditions, including operator setting of the throttle pedal, indicate that the operator will complete a splitter shift into target ratio, the engine will be fueled in accordance with operator throttle setting. If not, automatic engine fueling may occur. If the splitter section does engage prior to the main section, as is preferred, the operator will remain in complete control of engine fueling to complete the shift by engaging the main section.

The state of engagement (i.e., engaged or neutral) of the main transmission section 16A is an important control parameter for system 10. By way of example, if main section neutral is sensed, the splitter may be commanded to a full force engagement, regardless of the existence or absence of appropriate synchronous conditions. Also, if the main section is engaged while the splitter is in neutral, the system will not cause splitter engagement until an appropriate substantial synchronous condition is sensed and may then initiate automatic fuel control if required. Of course, it is important to prevent or minimize false determinations of main section neutral and/or engaged conditions.

Referring to FIG. 2, a first narrow band 202 and a second wider band 204 of vertical displacements from a center position 200 are utilized to determine if the main section is or is not in neutral. If the transmission main section is not confirmed as being in main section neutral, the neutral confirmation band will be the narrower band 202. This will assure that the main section 16A is truly in neutral before declaring a main section neutral condition. If the transmission main section 16A is confirmed as being in neutral, the neutral confirmation band will be the wider band 204. This assures that mere overshooting of neutral or raking of main section jaw clutches will not be incorrectly interpreted as a main section engaged condition.

Sensing the shift lever at point 206 will always be interpreted as main section neutral, and sensing the shift lever at point 208 will always be interpreted as main section engaged. However, if the shift lever is sensed at point 210, this will not cause a previous determination of a neutral or engaged condition to change.

Vehicle operating conditions other than or in addition to currently engaged or neutral condition of the main section 16A may be used to vary the width of the neutral sensing bands.

In the prior art automated mechanical transmission systems, when it was necessary to significantly reduce engine speed to synchronize for engaging an up-shift target gear ratio, the engine was commanded by controller 48 to reduce driveline torque to enable a shift to neutral, and to subsequently bring the engine speed to a synchronous target engine speed ($ES=ES_{TARGET}$). Certain engines of certain manufacturers also implement an engine governor control of the engine speed, such as a progressive shift engine governor control. The progressive shift engine governor control, in one embodiment, is stored or embedded in the form of logic steps within controller 36. The engine deceleration rate that occurs is dependent upon the engine manufacturer's implementation of its speed control mode and can sometimes be undesirably slow, as the speed control mode attempts to smoothly ramp engine speed to the target engine speed limit. "Ramped" is used to mean a modulated rate of deceleration less than the rate of unmodulated engine deceleration.

According to the present invention, Applicants have discovered that when a significant decrease in engine speed is required to execute a clutchless or float shift into an up-shift target gear ratio, and the vehicle is operating in a coasting condition, the progressive shift governor control may prevent shifting. Shifting may be prevented if transmission 16 is sustaining a torque load. The transmission will commonly be sustaining a negative torque load in the coasting condition. This negative torque condition undesirably induces a force within transmission 16 resisting a shift to neutral. To permit shifting the transmission, the driver is required to break the engine torque, typically by using the master clutch 14. Alternatively, if the operator is aware of the potential for the above-described condition, the operator may elect to shift earlier in an attempt to complete a clutchless, automation-assisted shift. However, this attempt to shift early may result in a lower than desired engine speed.

Figure 6:
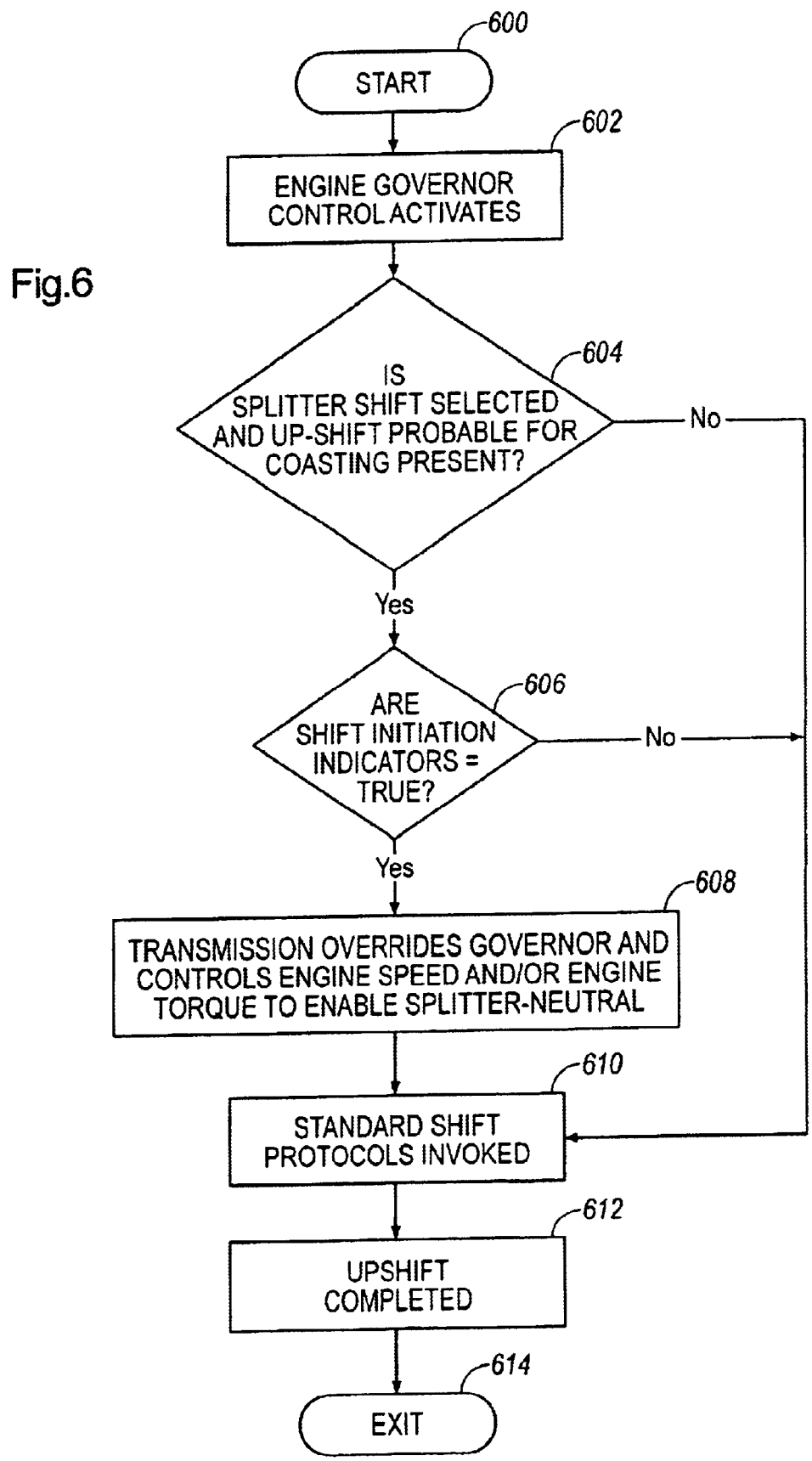
FIG. 6 is a schematic illustration, in flow chart format, of the splitter and governor control according to one aspect of the present invention.

According to one aspect of the invention, as shown in FIG. 6, a protocol for controlling splitter shifting in a controller-assisted manually shifted vehicular transmission system 10 is described. The protocol, in one embodiment, is stored or embedded in the form of logic steps within ECU 48. The protocol begins at step 600, and at step 602, the engine governor control, such as a progressive shift engine governor control, is activated. Next, the control unit or ECU 48 determines whether a splitter shift is selected and an automatic up-shift is probable, and whether a coasting condition is present in step 604. A splitter shift is selected when the operator depresses the splitter button. As a result, an up-shift target gear ratio is selected because the state of the splitter button dose not match the state correlating with a current gear ratio. For example, the operator may select a splitter shift when shifting from first ($1^{st}$) to second ($2^{nd}$) to automatically perform a float shift without using the master clutch 14. Whether an automatic up-shift is probable depends on vehicle conditions, such as engine speed and vehicle speed. Par example, an up-shift is probable when the engine speed is near maximum engine speed. A coasting condition exists when the vehicle is driving the engine, rather than the engine driving the vehicle, irrespective of the throttle position. For example, as mentioned previously, a coasting condition may be present when an engine speed is equal to or greater than an engine speed determined by an engine governor control. If a splitter shift has not been selected, or if neither an up-shift is probable, nor coasting is present, then the protocol proceeds to step 610 and standard shift protocols are invoked. The up-shift is completed in step 612, and the protocol ends at step 614.

If the conditions of step 604 are satisfied, the protocol proceeds to step 606 in which ECU 48 determines whether the shift initiation indicators are true, that is the indicators are consistent with the conditions appropriate for shifting, such as the splitter button being depressed, the throttle pedal is no longer being depressed by the operator, or the like. If not, then the protocol proceeds to steps 610, 612 and 614. If so, then the protocol proceeds to step 608 in which the transmission controller 48 overrides the engine governor control and increases engine torque such that the engine torque approaches, and preferably reaches a zero torque condition to enable the splitter auxiliary section to be shifted to a splitter-neutral condition required for the operator to engage an up-shift target gear ratio. By definition, increasing the engine torque is to overcome the negative torque condition of the transmission 16 by controlling the engine to reduce an absolute magnitude of torque sustained by the transmission. Ideally, the torque magnitude approaches, and preferably reaches zero.

In the coasting condition, the engine may be tending to slow down the vehicle and the engine speed may increase when the absolute magnitude of engine torque moves toward the engine zero torque condition. For example, to increase engine torque and/or engine speed, the controller 54 may send a message through the data link DL (FIG. 1) to send a controlled amount of fuel to the engine 12. Once the engine zero torque condition is reached, the established shift protocol in step 610 can be used to engage an up-shift target gear ratio in step 612. The protocol then ends in step 614.

Figure 7:
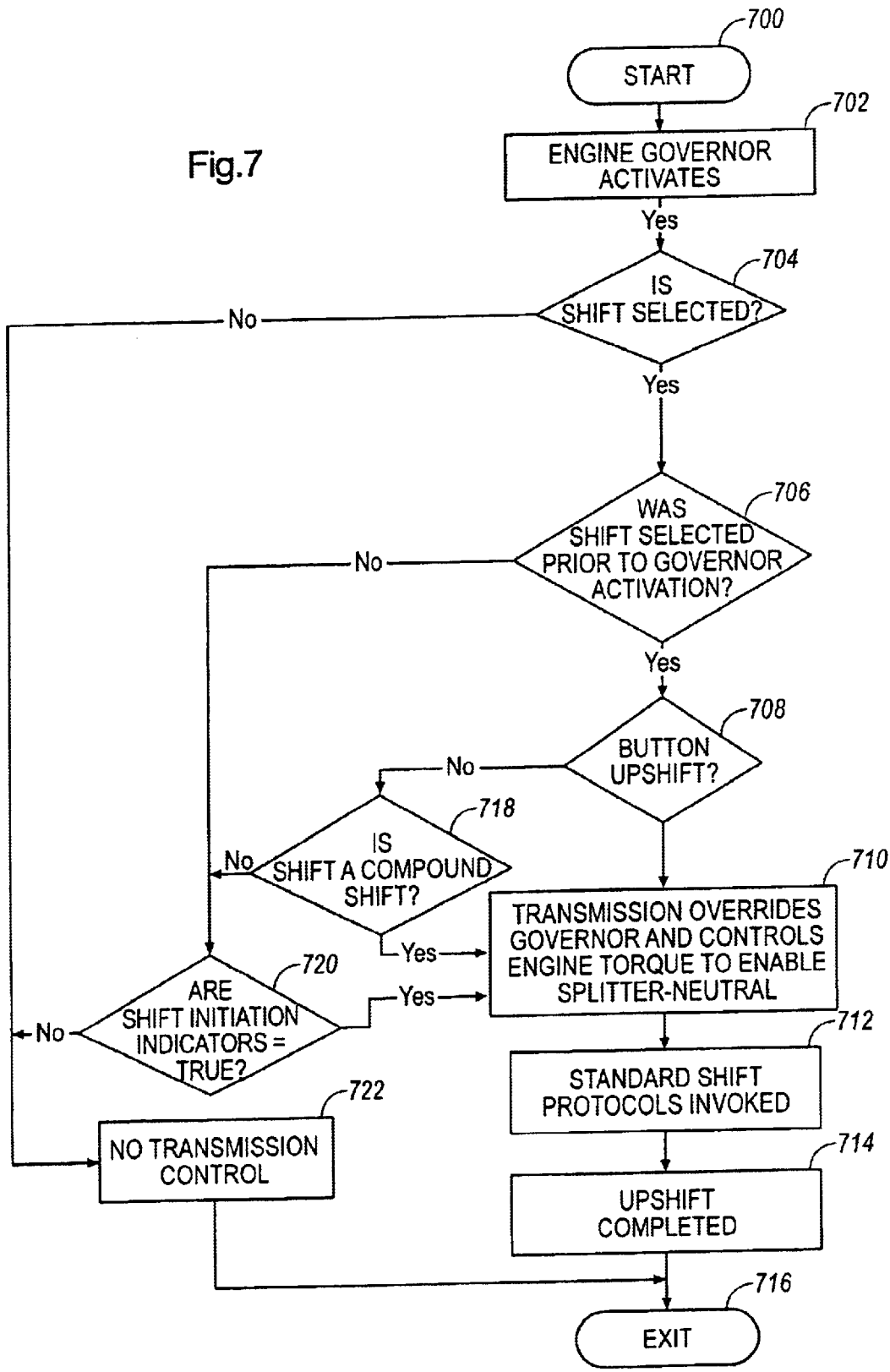
FIG. 7 is a schematic illustration, in flow chart format, of the splitter and governor control according to another aspect of the present invention.

According to another aspect of the invention, as shown in FIG. 7, an alternative protocol for controlling splitter shifting in a controller-assisted manually shifted vehicular transmission system 10 is described. The protocol begins at step 700. At step 702, the engine governor control, such as a progressive shift engine governor control, is activated. Next, a determination is made as to whether the operator has selected an up-shift by the position of the splitter button in step 704. If not, then the protocol proceeds to step 722 and ends at step 716. If so, then a determination is made as to whether the up-shift was selected prior to the activation of the governor control in step 706. If not, then the protocol proceeds to step 720 and determines whether the shift initiation indicators are true, similar to step 606 of FIG. 6. If so, the controller 48 overrides the governor control and increases engine torque such that the engine torque approaches, and preferably reaches a zero torque condition to enable the splitter auxiliary section to be shifted to a splitter-neutral condition required for the operator to engage an up-shift target gear ratio in step 710, similar to step 608 of FIG. 6. If the determination is made in step 720 that the shift initiation indicators are false, then the protocol proceeds to step 722 and the transmission system 10 does not override the governor control and exits in step 716.

If in step 706 a determination was made that up-shift was selected prior to the activation of the governor control, then the protocol proceeds to step 708 and a determination is made whether the operator has selected an automatic up-shift by depressing the splitter button to shift from, for example, first ($1^{st}$) to second ($2^{nd}$), and perform a float shift without using the master clutch 14. If so, then the protocol proceeds to steps 710 through 716. If not, then a determination is made in step 718 whether the operator has selected a manual compound shift. A manual compound shift occurs when the operator moves the shift lever, for example, from second ($2^{nd}$) to third ($3^{rd}$). If not, then the protocol proceeds to step 720 for a determination of whether the shift initiation indicators are true. If so, then the protocol proceeds to step 710 and the controller 48 overrides the governor control and increases engine torque such that the engine torque approaches, and preferably reaches a zero torque condition to enable the splitter auxiliary section to be shifted to a splitter-neutral condition required for the operator to engage an up-shift target gear ratio. Then, the protocol proceeds to step 712 through 716, similar to steps 610 through 614 of FIG. 6.

As can be seen with both aspects of the invention described in FIGS. 6 and 7, the transmission system 10 temporarily overrides the engine governor control, for example, a progressive shift governor control, and increases engine torque such that the engine torque approaches, and preferably reaches a zero torque condition to enable the splitter auxiliary section to be shifted to a splitter-neutral condition required for the operator to engage an up-shift target gear ratio. This overriding feature can be accomplished, for example, by the controller 48 sending a message through the data link DL to send a controlled amount of fuel to the engine 12, thereby temporarily overriding the engine governor control. Once the zero torque condition is reached, an established shift protocol can be used to engage the up-shift target gear ratio.

While the invention has been specifically described in connection with certain specific embodiments thereof, it is to be understood that this is by way of illustration and not of limitation, and the scope of the appended claims should be construed as broadly as the prior art will permit.

What is claimed is:

1. A method for controlling splitter shifting in a controller-assisted, manually shifted vehicular transmission system, said method comprising the steps:
    sensing if (1) an up-shift target gear ratio is selected and (2) a coasting condition is present; and
    controlling an engine torque to approach a zero torque condition in response to said sensing step being satisfied, thereby enabling a splitter auxiliary section to be placed in a splitter-neutral condition.

2. The method of claim 1, further including the step of commanding the splitter auxiliary section to be engaged in the up-shift target gear ratio.

3. The method of claim 2, wherein said commanding step is performed by an established shift protocol.

4. The method of claim 1, wherein the zero torque condition is produced by controlling a supply of fuel to an engine to increase one of the engine speed and the engine torque.

5. The method of claim 1, wherein said controlling step is performed by overriding an engine governor control.

6. The method of claim 1, wherein said up-shift target gear ratio is selected because a state of a splitter button does not match a state correlating with a current gear ratio.

7. The method of claim 1, wherein said coasting condition is present when an engine speed is equal to or greater than an engine speed determined by an engine governor control.

8. A method for controlling splitter shifting in a controller-assisted, manually shifted vehicular transmission system, said method comprising the steps:
    sensing if (1) an up-shift target gear ratio is selected and (2) a coasting condition is present; and
    overriding an engine governor control to approach a zero torque condition in response to said sensing step being satisfied, thereby enabling a splitter auxiliary section to be placed in a splitter-neutral condition.

9. The method of claim 8, wherein the zero torque condition is produced by controlling a supply of fuel to an engine to increase one of the engine speed and the engine torque.

10. The method of claim 8, further comprising the step of commanding the splitter auxiliary section to be engaged in the up-shift target gear ratio.

11. The method of claim 10, wherein said commanding step is performed by an established shift protocol.

12. The method of claim 8, wherein said up-shift target gear ratio is selected because a state of a splitter button does not match a state correlating with a current gear ratio.

13. The method of claim 8, wherein said coasting condition is present when an engine speed is equal to or greater than an engine speed determined by an engine governor control.

14. A method for controlling splitter shifting in a controller-assisted, manually shifted vehicular transmission system, said method comprising the steps:
    sensing if (1) an up-shift target gear ratio is selected and (2) a coasting condition is present; and in response to said sensing being satisfied,
    temporarily overriding an engine governor control to enabling a splitter auxiliary section to be placed in a splitter-neutral condition.

15. The method of claim 14, wherein said overriding step is performed by controlling an engine torque such that the engine torque approaches a zero torque condition when said sensing step is satisfied, thereby.

16. The method of claim 15, wherein the zero torque condition is produced by controlling a supply of fuel to an engine to increase one of the engine speed and the engine torque.

17. The method of claim 14, wherein said coasting condition is present when an engine speed is equal to or greater than an engine speed determined by an engine governor.

18. A controller-assisted, manually shifted vehicular transmission system comprising an internal combustion engine driving an input shaft of a compound transmission having a multiple-ratio main section shifted by a shift lever manually movable in a shift pattern and a splitter auxiliary section connected in series with said main section, a splitter shift mechanism for automatically implementing splitter shifts and a controller for receiving input signals indicative of system operating conditions and for processing same according to predetermined logic rules to issue command output signals to system actuators, including said splitter shift mechanism, wherein said controller includes logic rules for:

sensing if (i) an up-shift target gear ratio is selected and (ii) a coasting condition is present; and controlling an engine torque to approach a zero torque condition in response to the up-shift target gear ratio being selected and the coasting condition being present, thereby enabling the splitter auxiliary section to be placed in a splitter-neutral condition.

19. The system of claim 18, wherein said controller further includes logic rules for commanding the splitter auxiliary section to be engaged in the up-shift target gear ratio.

20. The system of claim 18, wherein the zero torque condition is produced by controlling a supply of fuel to the engine to increase the engine torque.

21. The system of claim 18, wherein the zero torque condition is produced by overriding the engine governor control.

* * * * *